UNITED STATES PATENT OFFICE.

LOREN CHADWICK, OF BATTLE CREEK, MICHIGAN.

BLACKBOARD COMPOSITION.

SPECIFICATION forming part of Letters Patent No. 330,375, dated November 17, 1885.

Application filed September 23, 1885. Serial No. 177,906. (No specimens.)

*To all whom it may concern:*

Be it known that I, LOREN CHADWICK, a citizen of the United States, residing at Battle Creek, in the county of Calhoun and State of Michigan, have invented certain new and useful Improvements in Blackboard Compositions; and I do declare the following to be a full, clear, and exact description of the invention, such as will enable others skilled in the art to which it appertains to make and use the same.

This invention relates to the manufacture of blackboard-surfaces upon the walls of buildings; and it consists in two compositions, which are applied to the walls of the building. The first composition forms the foundation for the blackboard finish, and the second composition constitutes the finishing-coat. These two compositions are previously prepared and mixed in a dry state, and sold in that shape as articles of manufacture, and are adapted to be applied by any mason when mixed with water.

The ground-work composition is composed of the following ingredients in substantially the proportions given: hydraulic cement, twenty pounds; sand, thirty pounds; calcined sulphate of lime, ten pounds; lime, five pounds. These ingredients to be well pulverized and thoroughly mixed, and when the composition is used sufficient water should be added to render it of the consistency of ordinary plaster. When this foundation composition has been applied to the wall, the finishing-coat is applied. This consists of the following ingredients in substantially the specified proportions: hydraulic cement, thirty pounds; calcined sulphate of lime, twenty pounds; lime, ten pounds; black sand, twenty pounds; lamp-black, three pounds. These ingredients to be thoroughly mixed together, and the composition is ready to be applied on being mixed with water.

The hydraulic cement used is preferably the finest grade of English Portland cement, especially for the finishing-coat.

I claim as my invention—

1. A blackboard composition which contains hydraulic cement as an essential ingredient.

2. A finishing blackboard composition composed of hydraulic cement, calcined sulphate of lime, lime, black sand, and lamp-black, substantially as set forth.

3. A blackboard dressing consisting of a foundation-coat of hydraulic cement, sand, calcined sulphate of lime, and lime, and a finishing-coat composed of hydraulic cement, calcined sulphate of lime, lime, black sand, and lamp-black, substantially as set forth.

In testimony whereof I affix my signature in presence of two witnesses.

LOREN CHADWICK.

Witnesses:
NATHAN H. BRIGGS,
FRED M. WADLEIGH.